United States Patent
Katyl et al.

[11] Patent Number: 5,930,130
[45] Date of Patent: Jul. 27, 1999

[54] INRUSH PROTECTION CIRCUIT

[75] Inventors: Robert H. Katyl, Vestal; Robert M. Murcko, Binghamton; David W. Dranchak, Endwell, all of N.Y.

[73] Assignee: JRS Technology, Inc., Endicott, N.Y.

[21] Appl. No.: 08/940,067

[22] Filed: Sep. 29, 1997

[51] Int. Cl.$^6$ .......................... H02H 7/125; H02M 5/42; G05F 1/10

[52] U.S. Cl. .............. 363/53; 363/89; 323/222; 323/282; 323/908; 315/247

[58] Field of Search ................ 363/53, 44, 89; 323/908, 282, 222; 315/247, 307

[56] References Cited

U.S. PATENT DOCUMENTS

| | | | |
|---|---|---|---|
| 4,631,470 | 12/1986 | Bingley | 323/282 |
| 4,769,752 | 9/1988 | Rackowe | 323/908 |
| 4,982,306 | 1/1991 | Koroncai et al. | 323/908 |
| 5,122,724 | 6/1992 | Criss | 323/222 |
| 5,187,653 | 2/1993 | Lorenz | 363/89 |
| 5,519,289 | 5/1996 | Katyl et al. | 315/224 |
| 5,729,062 | 3/1998 | Satoh | 323/908 |

OTHER PUBLICATIONS

Billings, Keith "Switchmode Power Supply Handbook", McGraw–Hill, Chapter 7, 1989.

*Primary Examiner*—Peter S. Wong
*Assistant Examiner*—Rajnikant B. Patel
*Attorney, Agent, or Firm*—Salzman & Levy

[57] ABSTRACT

A large inrush of electrical current flow occurs during a short interval after switch closure, when power is applied to a conventional electronic ballast commonly used for fluorescent lighting. This inrush current flows as the main filter capacitor in the ballast charges to its steady state value. For a lighting circuit that contains a multiplicity of ballasts, the combined magnitude of the inrush is potentially large enough to cause contact failure of the switching device due to arcing and contact welding. The invention features a circuit for limiting inrush current having a current-limiting resistor that is active for a brief interval during startup. The resistor is subsequently bypassed from the principal current path by a switching transistor. The transistor is controlled by electrical signals normally present in conventional electronic ballasts. The advantage of the inventive circuitry is the use of only two inexpensive components to accomplish inrush current protection.

7 Claims, 4 Drawing Sheets

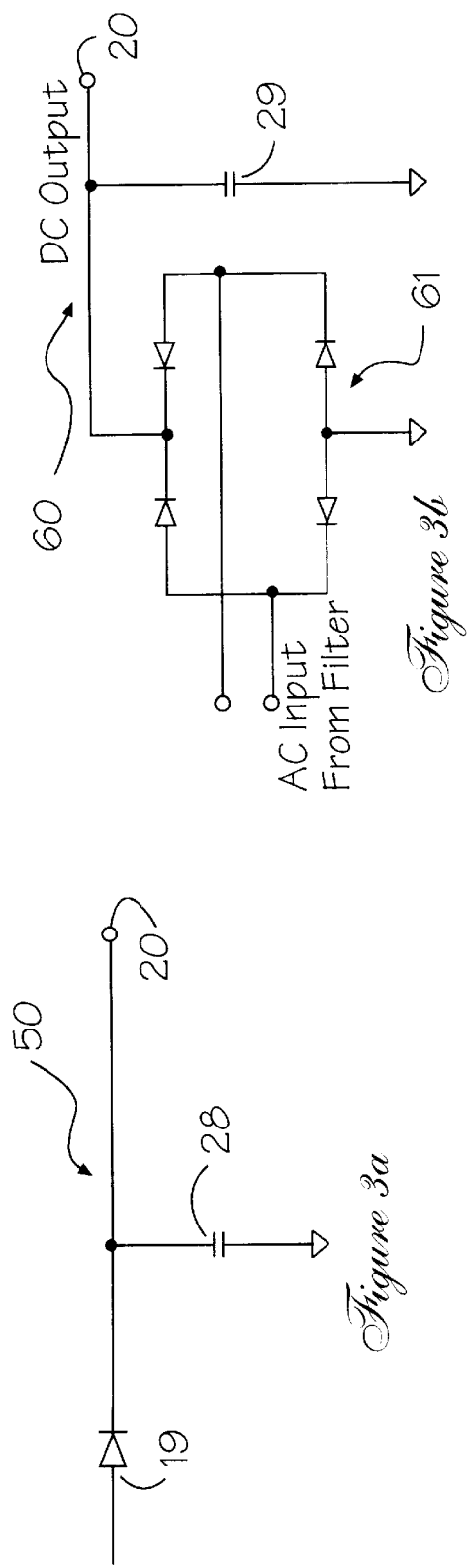
Figure 3b
Figure 3a
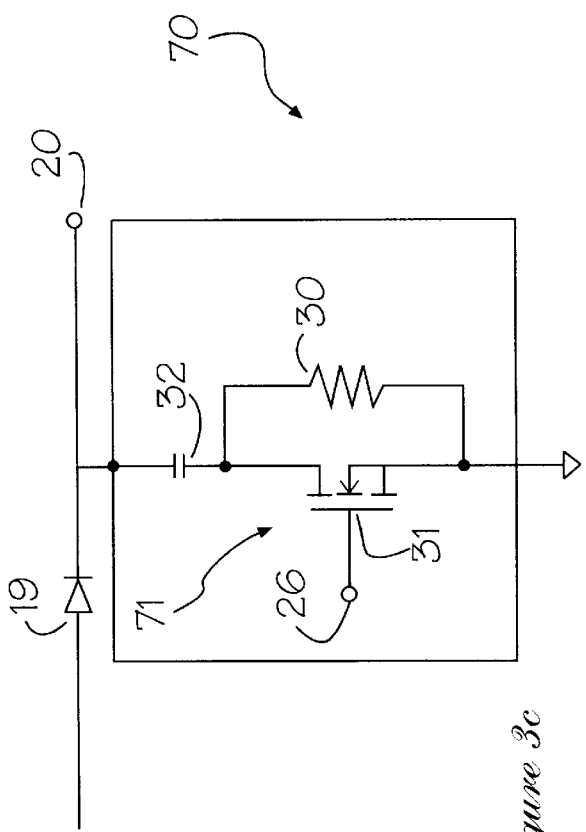
Figure 3c

INRUSH PROTECTION CIRCUIT

FIELD OF THE INVENTION

The present invention relates to ballast circuits for fluorescent lighting and, more particularly, to an inrush circuit that limits inrush current for an energy efficient fluorescent lighting ballast.

BACKGROUND OF THE INVENTION

A modern electronic ballast is optimized for maximum electrical efficiency by minimizing consumption of electrical power. Unfortunately, the changes made to improve the efficiency of the ballast reduce certain internal electrical resistances. This gives rise to a new problem: the occurrence of a large inrush of current upon the first application of electrical power. This inrush current flows as the main filter capacitor in the ballast charges to its steady state value. For a lighting circuit that contains a multiplicity of ballasts, the combined magnitude of the inrush is potentially large enough to cause contact failure of the switching device due to arcing and contact welding.

An example of such a lighting circuit is one in which certain lights are controlled by a sensor that detects the presence of personnel by sensing their motion. With conventional technology, switch device failure is common.

The present invention presents a simple, cost-effective circuit for limiting inrush current to the ballast. The inventive circuit contains a current-limiting resistor that is active for a brief interval during startup. This resistor is subsequently bypassed from the principal current path by a switching transistor. The circuit of this invention provides minimal power loss during operation.

DISCUSSION OF RELATED ART

Inrush current can cause switch burn-out or premature failure of fuses or circuit breakers. Inrush suppression by switching a series resistance is an old, well-established technique in electrical engineering to limit inrush current. Inrush current suppression techniques are described in Chapter 7 of the "Switchmode Power Supply Handbook", by Keith Billings, McGraw-Hill, 1989. Inrush suppression is commonly used, for example, in large power supplies that have very large capacitors that cannot be placed directly across the power line during initial startup without causing severe inrush current problems. The switching devices commonly used are time delay relays, triacs, SCRs, or thermistors.

In U.S. Pat. No. 5,122,724, issued to Criss on Jun. 16, 1992, for INRUSH CURRENT LIMITER, a circuit is shown that limits current in DC-to-DC and DC-to-AC power supplies. The circuit comprises a FET transistor, the slowly reducing resistance of which provides inrush current-limiting.

The inrush current limiting circuit of the present invention differs from the prior art in that fewer, lower cost components are used to suppress the inrush current.

SUMMARY OF THE INVENTION

In accordance with the present invention, there is provided a new inrush circuit for fluorescent ballasts. A large inrush of current flow occurs during a short interval after switch closure, when power is applied to most conventional electronic ballasts that are presently used for fluorescent lighting. This inrush current flows as the main filter capacitor in the ballast charges to its steady state value. For a lighting circuit that contains a multiplicity of ballasts, the combined magnitude of the inrush is large enough to potentially cause contact failure of the switching device due to arcing and contact welding. The invention features a circuit for limiting inrush current comprising a current-limiting resistor that is active for a brief interval during startup. The resistor is subsequently bypassed from the principal current path by a switching transistor. The transistor is controlled by electrical signals normally present in conventional electronic ballasts. One of the advantages of the inventive circuitry is the use of only two inexpensive components to accomplish inrush current protection. Another advantage of using this circuit is minimal power loss during normal operation of the ballast.

It is an object of this invention to provide an improved inrush current prevention circuit for electronic ballasts used in fluorescent lighting systems.

It is another object of the invention to provide a low cost inrush current prevention circuit.

It is yet another object of this invention to provide an inrush current prevention circuit having a minimum number of components.

It is a further object of the invention to provide an inrush current prevention circuit that has a minimal power loss during normal operation of the ballast.

BRIEF DESCRIPTION OF THE DRAWINGS

A complete understanding of the present invention may be obtained by reference to the accompanying drawings, when considered in conjunction with the subsequent detailed description, in which:

FIG. 3a illustrates an electrical diagram of a ripple filtering circuit used in boost type PFC circuits;

FIG. 3b shows a standard full wave rectifier DC supply subject to inrush currents;

FIG. 3c depicts a circuit diagram of the inrush circuit of the invention, in which inrush current is circumvented.

DESCRIPTION OF THE PREFERRED EMBODIMENT

The invention features circuitry that is added to enhance the operation of an energy efficient electronic ballast that is used for fluorescent or other gas discharge lighting. The circuit limits inrush current applicable to ballasts having either active or passive power factor correction circuitry. The circuit comprises a series resistance to limit the inrush. The resistance is subsequently bypassed during the normal operation of the ballast. The circuit is activated by an internal voltage normally present within the ballast to provide the control of the switching sequencing.

Figure 1:
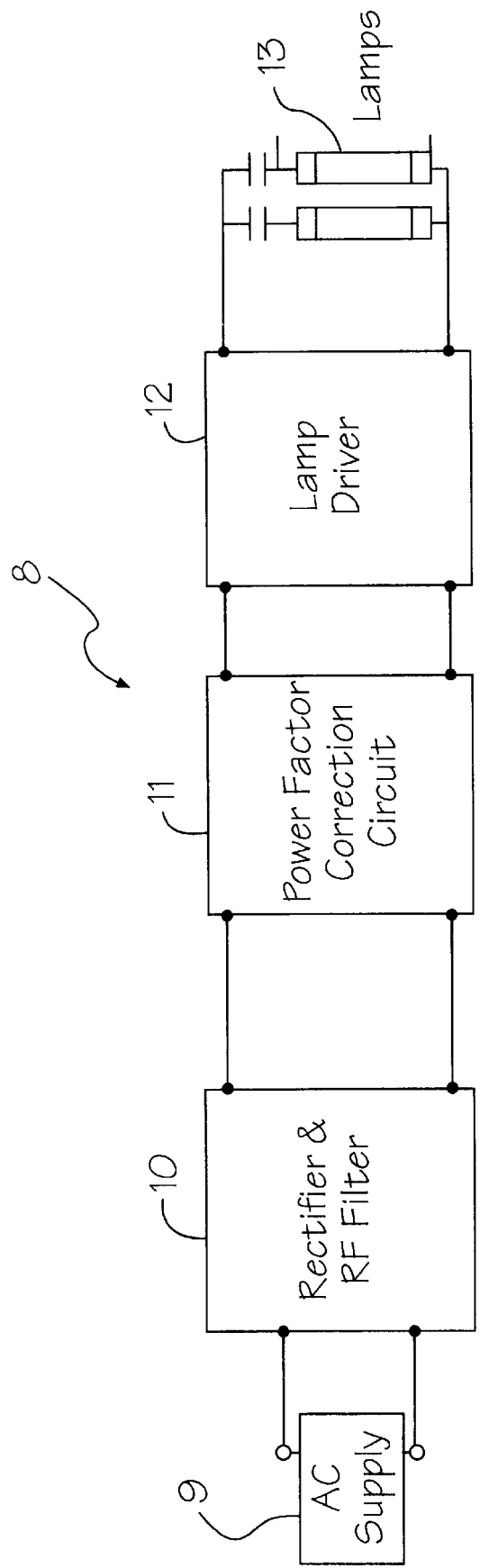
FIG. 1 illustrates a block diagram of an electronic ballast with active power factor correction (PFC) circuitry.

Now referring to FIG. 1, ballast circuitry 8 for a fluorescent lamp arrangement 13, is illustrated. Such a ballast circuit 8 may use integrated circuit chips in a PFC circuit 11 to accomplish power factor correction. This type of ballast is considered to have active correction. Other types of circuitry that accomplish this correction by tuned inductance and capacitance filter type circuitry have passive correction. Inrush current is a significant concern with either correction type.

An example of a ballast that uses active correction can be found in U.S. Pat. No. 5,519,289, issued to Katyl and Murcko, on May 21, 1996. An example of a ballast that uses passive correction is described in the aforementioned U.S. Pat. No. 5,122,724.

The inrush protection circuitry of the present invention can operate in either power factor correction method. For simplicity, the active type of circuit is described in detail. Those skilled in the art will be able to apply these concepts to other ballast types as well as to other applications with switching power supplies.

Referring again to FIG. 1, the ballast circuit 8 comprises an AC power supply 9, which is filtered and rectified (circuit block 10), and applied to a power factor correction circuit 11. The DC output from this circuit 11 is then converted by a lamp driver or inverter 12 into high frequency AC voltage, which is then coupled to the fluorescent lamps 13. The high frequencies used are typically in the 25 kHz to 80 kHz range. Operation of lamps in this frequency range increase their energy efficiency.

Figure 2:
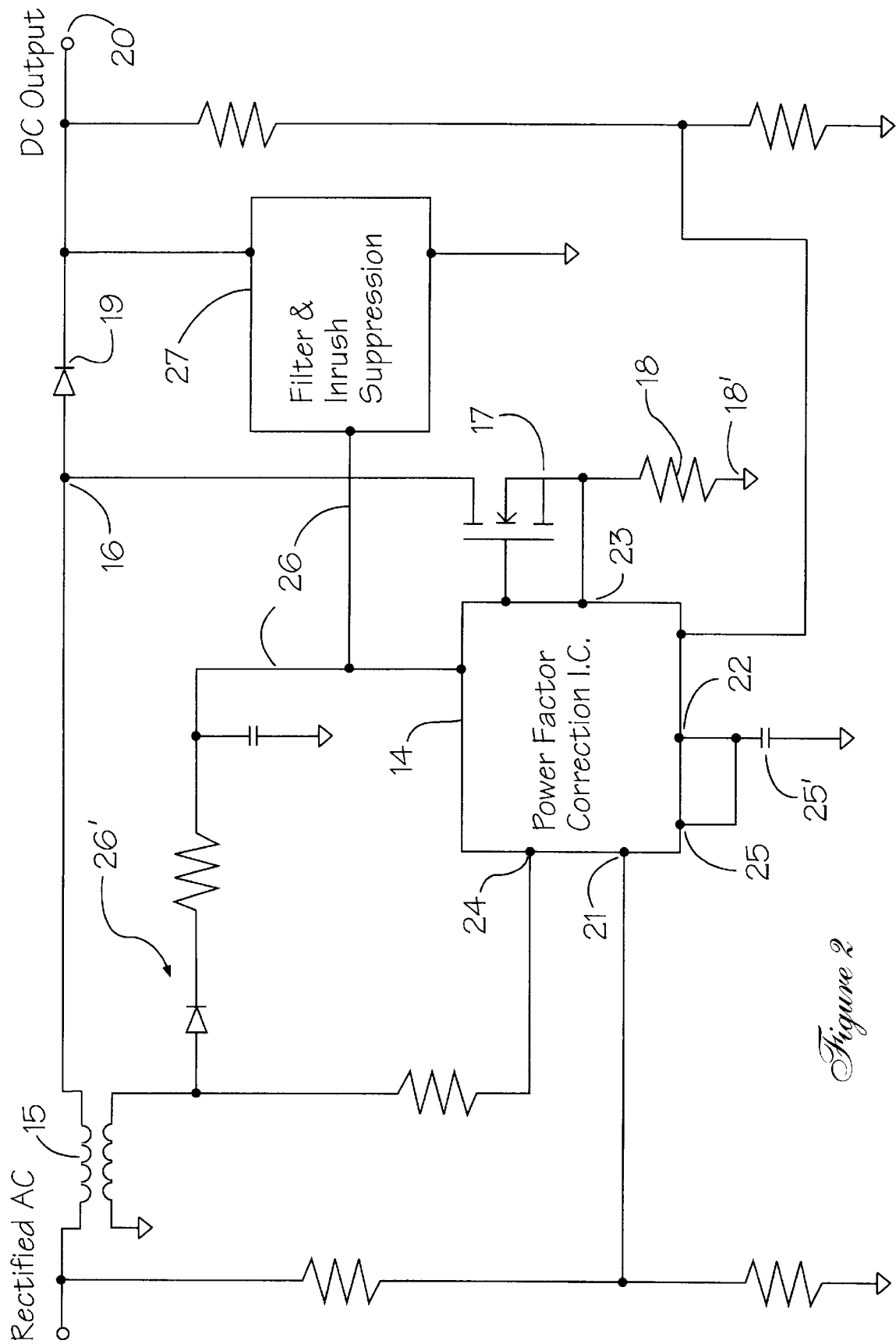
FIG. 2 depicts a detailed circuit diagram of the electronic ballast shown in FIG. 1.

Referring to FIG. 2, the details of an active PFC circuit are shown. A PFC integrated circuit 14 forms the core of the circuit diagram. Examples of power factor chips include the Model No. TDA 4832, manufactured by Siemens, Inc., the Model No. ML4832 by Microlinear Corp., and the Model No. MC34262 by Motorola, Inc. This list is not exhaustive; several other chips are commonly available. The type of chip considered herein is exemplary, for illustrative purposes. For simplicity, chips having the discontinuous boost type of topology, of which the Siemens or Motorola ICs are examples, are considered here. The term discontinuous is explained hereinbelow.

Rectified AC current is directed through the primary of inductor 15 to nodal point 16. As directed by the control circuitry on IC 14, the current at point 16 is either (a) directed to ground 18' through power MOSFET 17 and low ohmic value current sense resistor 18, or (b) directed through diode 19 into the load circuitry connected to the dc output 20. The IC circuitry 14 senses the shape of the rectified AC voltage on input 21, senses the level of the DC output voltage on input 22, senses the MOSFET current on input 23, and senses the state of the magnetic flux within inductor 15 on input 24. Input 25 is used for connection of a frequency compensation capacitor 25'. Signal 26 is the supply voltage used to provide power to the IC 14 via a bootstrap rectifier 26' connected to the secondary of inductor 15.

During operation, the IC 14 pulses MOSFET switch 17 ON for a brief interval. This is the charge time during which inductor 15 gains magnetic flux from the flow of current from point 16 to ground 18'. During the charge time, diode 19 blocks backward conduction of the DC output voltage into the MOSFET switch 17. MOSFET 17 is turned OFF when the chip circuitry 14 determines that the charging current is sufficiently high to produce the correct load current and voltage. The current through inductor 15 cannot stop immediately, but the stored inductive energy raises the voltage at nodal point 16 sufficiently high so that forward conduction of the current occurs through diode 19. The voltage at DC output 20 always exceeds the AC supply peak value. The circuit 14 is called a boost type PFC circuit. It is a discontinuous type of circuit, since the chip algorithms switch MOSFET 17 ON when current through inductor 15 reaches zero. Thus, the current at the end of each cycle is discontinuous in nature; the current waveform is a set of separate waveforms starting and ending at zero current.

Chips having the continuous topology switch during times when current through the inductor 15 and MOSFET 17 have not reached zero, are called continuous boost type circuits. The inrush control circuitry of this invention is also applicable to these types of circuits.

Referring to FIG. 3a, a standard AC ripple filtering circuit 50 is shown. This circuit 50, used in a conventional DC supply, uses a large filter capacitor 28 across the output 20 thereof. It can be used in the boost type PFC circuit, illustrated in FIG. 2.

Referring to FIG. 3b, a capacitor 29, shown in the circuit 60, can be used in a standard full wave rectifier DC supply 61, common to many electronic devices. The inrush current arises when the AC supply is first switched ON, and the filter capacitor 29 has zero stored charge. The worst case occurs when the AC supply is connected at the time when the ac voltage is at its maximum value. The large capacitor 29 acts for a short interval as a short circuit across the power supply output 20. A very large surge current impulse flows as the capacitor 29 becomes charged. Peak currents of several tens of amperes are possible. This large current impulse can damage electrical components internal to the supply, such as the rectifying diodes. Connecting several units simultaneously, as through a relay switch contact, can cause a surge current of sufficient magnitude to cause contact welding and relay failure.

Referring to FIG. 3c, the inventive circuit 70 of this invention is described. The circuit 70 circumvents the inrush problem by placing a large resistance 30 in series with the capacitor 32. After the inrush interval, a switching device 71 (MOSFET transistor 31) disposed across the resistance 30, is closed to eliminate it, and its power loss, from the circuit 70. Filter capacitor 32, shown here across the output of a boost PFC supply, is connected in series with resistor 30, across which is disposed MOSFET transistor 31, as aforementioned. In the case of a boost PFC circuit as described in FIG. 2, the control of the MOSFET 31 is realized by simply connecting the MOSFET gate lead to IC supply voltage 26. This voltage typically rises sufficiently slowly so that the MOSFET 31 is held in the OFF state during the inrush interval, and turns ON to short out resistor 30 before the PFC IC 14 is activated. Also, the IC voltage 26 has a magnitude selected to control the gate without exceeding the maximum allowable voltage (typically 20 volts). This is due to the fact that the voltage is selected to match the requirements of the PFC switch MOSFET 17 (FIG. 2).

It should be noted that there are several advantages to this simple circuit. Only two added components are required: elements 30 and 31. Resistor 30 is disconnected during normal operation, thus minimizing the power losses that usually occur when other conventional components, such as switching thermistors or relays, are used. Existing signals within the PFC 14 are used to control the switching of MOSFET 31. Resistor 30 can be chosen to set the value of the inrush current. For example, if chosen to be 100 ohms, and if the peak value of the 120 volt AC supply voltage is 170 volts, then the largest possible inrush current will have a value of 170 volts/100 ohms=1.7 amperes. This value is considerably smaller than the 50 to 80 ampere inrush surges that can occur in conventional circuitry.

Figure 4:
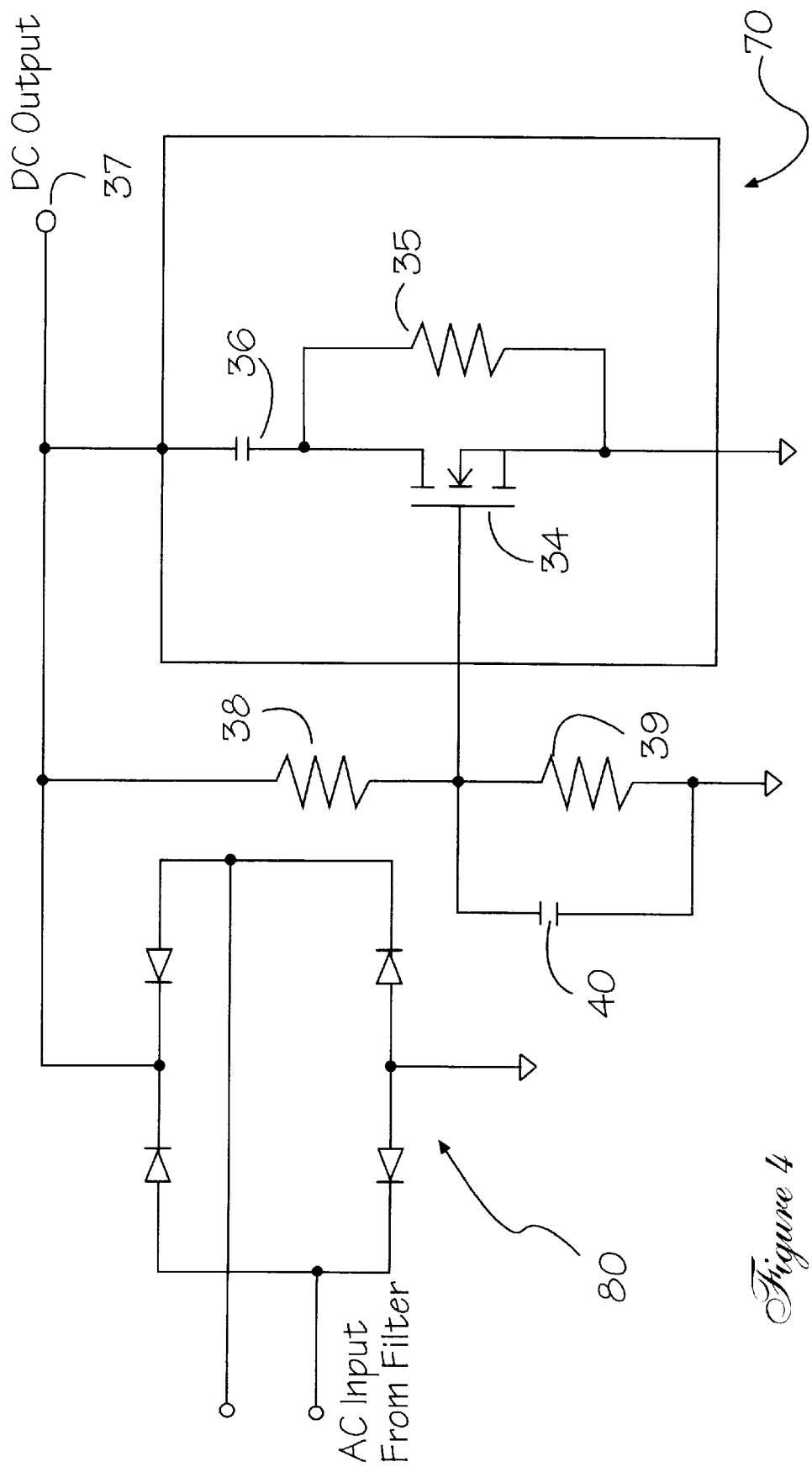
FIG. 4 illustrates a circuit diagram of a full wave rectifier supply comprising the inrush suppression circuit of this invention.

Referring to FIG. 4, the same technique can be used with a conventional rectifier supply 80. A conventional full wave rectifier is connected to an inrush suppressing circuit 70, depicted in FIG. 3c. The inrush circuit 70 uses a conventional filter capacitor 36, but a parallel combination of resistor 35 and MOSFET 34 are connected in series with the capacitor 36. Resistors 38 and 39 and timing capacitor 40 provide control signals to the MOSFET 34. When the supply is first switched ON and capacitor 36 has zero stored charge, MOSFET 34 is held OFF by the zero voltage of capacitor 40. With the MOSFET switch 34 in the OFF state, the charging current (inrush current) is limited in value by current-limiting resistor 35. After several power line cycles, capacitor 40 charges up above the threshold voltage of MOSFET 34, so that MOSFET 34 switches ON. Current to capacitor 36 during remaining operational use of the supply is routed through the MOSFET switch 34, which has a low voltage drop. Thus, minimal impact results to the normal operation of the circuit. A MOSFET transistor, as compared to power bipolar transistors, or IGBT devices, is the best choice for the switching device. The chip supply voltage matches the gate voltage requirement of MOSFET so that no additional components are needed, as would be the case if a bipolar switching transistor were used. Also, the gate circuit has zero power dissipation, while the current consumption of a bipolar device would exceed that of a typical PFC IC. The MOSFET operates in its resistive mode with low voltage drop significantly lower than that of an IGBT switching device.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An electronic power supply system in combination with a filtering capacitor, said electronic power supply system comprising inrush current circuitry, including:
   a current-limiting resistor placed in series with the filtering capacitor; and
   a MOSFET switching device placed in parallel with said current-limiting resistor to bypass current around the current-limiting resistor during normal steady state circuit operation, said MOSFET being open only during an initial interval of time when said capacitor is being charged, said MOSFET being controlled by a timing network of resistors and capacitors contained in said power supply system, said MOSFET closing after said initial interval of time and remaining closed until removal of substantially all current from said MOSFET.

2. A rectifier power supply system in combination with a filtering capacitor, said power supply system comprising inrush current circuitry, including:
   a current-limiting resistor placed in series with the filtering capacitor; and
   a MOSFET switching device placed in parallel with said current-limiting resistor to bypass current around the current-limiting resistor during normal steady state circuit operation, said MOSFET being open only during an initial interval of time when said capacitor is being charged, said MOSFET being controlled by a timing network of resistors and capacitors contained in said rectifier power supply system, said MOSFET closing after said initial interval of time and remaining closed until removal of substantially all current from said MOSFET.

3. A switch-mode supply system in combination with a filtering capacitor, said switch-mode supply system comprising inrush current circuitry, including:
   a current-limiting resistor placed in series with the filtering capacitor; and
   a MOSFET switching device placed in parallel with said current-limiting resistor to bypass current around the current-limiting resistor during normal steady state circuit operation, said MOSFET being open only during an initial interval of time when said capacitor is being charged, said MOSFET being controlled by a timing network of resistors and capacitors contained in said switch-mode supply system, said MOSFET closing after said initial interval of time and remaining closed until removal of substantially all current from said MOSFET.

4. An electronic ballast, used for energizing fluorescent or gas discharge lighting, in combination with a filtering capacitor, said electronic ballast comprising inrush current circuitry, including:
   a current-limiting resistor placed in series with the filtering capacitor; and
   a MOSFET switching device placed in parallel with said current-limiting resistor to bypass current around the current-limiting resistor during normal steady state circuit operation, said MOSFET being open only during an initial interval of time when said capacitor is being charged, said MOSFET being controlled by a timing network of resistors and capacitors contained in said electronic ballast, said MOSFET closing after said initial interval of time and remaining closed until removal of substantially all current from said MOSFET.

5. An electronic ballast for use with a gas-discharge lamp, comprising:
   a) a power supply adapted to receive low-frequency, ac from a power line and provide a high-frequency, ac signal to said gas-discharge lamp;
   b) power factor correction means operatively connected to said power supply for controlling the power factor of said power supply; and
   c) inrush current limiting means operatively connected to said power factor correction means, comprising:
      i) a current limiting resistor;
      ii) switching means operatively connected to said current-limiting resistor so that when said switching means is activated, said current-limiting resistor limits the flow of current from said power line into said power supply; and
      iii) timing means operatively connected to said switching means, said switching means being activated for only a predetermined time after said power supply first receives said low-frequency ac from said power line, whereby the load placed on said power line by said power supply is limited by said inrush current-limiting means during said predetermined time.

6. The electronic ballast for use with a gas-discharge lamp as claimed in claim 5, wherein said switching means comprises a field-effect transistor (FET).

7. An electronic ballast for use with a gas-discharge lighting system, comprising:
   a) ballast means adapted to receive low-frequency ac power from a power line and to provide high-frequency, ac power to a gas-discharge lamp; and
   b) inrush current limiting means connected between said ballast means and said power line, said inrush current limiting means being operable for a predetermined time unrelated to any condition on said power line;
whereby the load placed on said power line by said ballast means when power is first applied to said ballast means is limited during said predetermined time period.

* * * * *